March 28, 1933.  E. E. PECK  1,903,265
STEERING MECHANISM FOR BOATS
Filed June 16, 1930
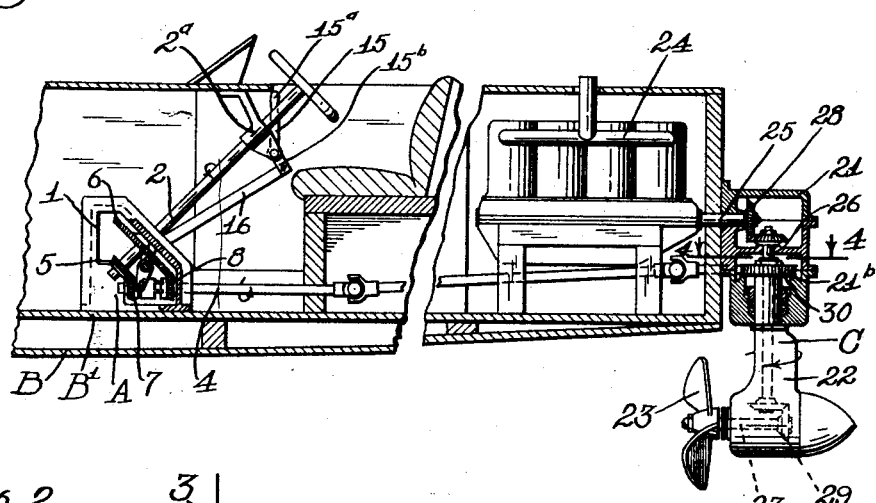
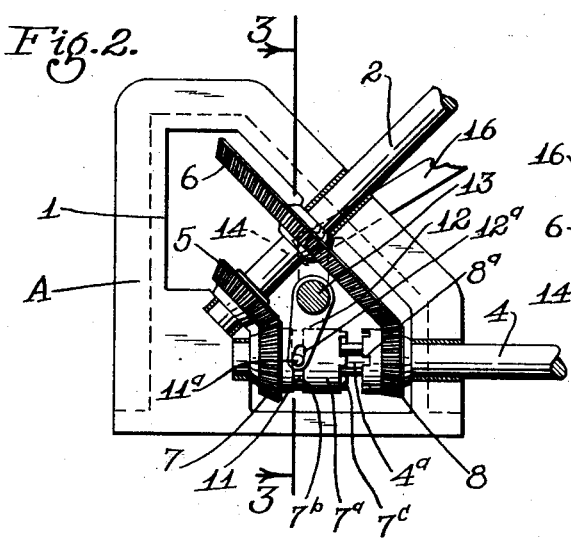
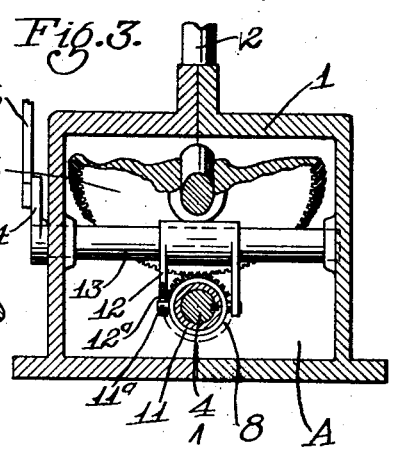
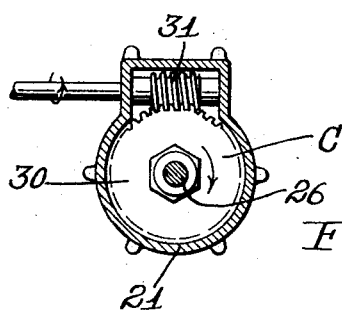
INVENTOR
ELMER E. PECK
BY A. B. Bowman
ATTORNEY Patented Mar. 28, 1933

1,903,265

UNITED STATES PATENT OFFICE

ELMER E. PECK, OF LONG BEACH, CALIFORNIA

STEERING MECHANISM FOR BOATS

Application filed June 16, 1930. Serial No. 461,568.

My invention relates to steering mechanism, more particularly to steering mechanism adapted for use with outboard propelling means for boats, and generally for boats in which the propeller is turned about a vertical axis for steering purposes.

The objects of my invention are: first, to provide a steering mechanism whereby the turning ratio between the steering wheel and the object to be turned by said wheel may be varied and one whereby the ratio may be easily and quickly varied; second, to provide a steering mechanism for boats in which the propeller is used for steering purposes, and in which a slow turning ratio between the steering wheel and the propeller supporting housing is available while traveling at high speed, and a fast turning ratio is available while maneuvering, particularly for going astern; third, to provide a steering wheel for outboard propelling means for boats whereby the propeller supporting housing may be quickly turned through 180 degrees about a vertical axis, thereby reversing the direction of the boat; fourth, to provide as a whole a novelly constructed steering wheel of this class and one that is simple and economical of construction combined with lasting durability and one that will not readily deteriorate or get out of order.

With these and other objects in view as will appear hereinafter, my invention consists of certain novel features of construction, combination and arrangement of parts and portions, as will be hereinafter described in detail, and more particularly set forth in the appended claims, reference being had to the accompanying drawing and to the characters of reference thereon which form a part of this application in which:

Figure 1 is a longitudinal sectional elevation of the aft end of a motor boat, showing an outboard propelling mechanism mounted at the rear end thereof, and showing one form of my steering mechanism mounted therein and connected to said propelling mechanism; Fig. 2 is an enlarged sectional view showing the gearing arangement and means for shifting the gears in my steering gear mechanism; Fig. 3 is a sectional view taken at 3—3 of Fig. 2; and Fig. 4 is a sectional view taken through 4—4 of Fig. 1, showing the steering mechanism in the propeller means.

Like characters of reference refer to similar parts and portions throughout the views of the drawing.

Figure 1 of the drawing shows the general relation, in one form, of one form of steering device, designated A, mounted in a boat B, and operatively connected to an outboard propelling mechanism C, located at the stern of the boat B.

The gearing and other working parts of the steering device A, illustrated in the drawing, are contained within a housing 1, which is supported, in this instance, on the floor B1 of the boat. In the housing are journaled a pair of shafts 2 and 4, the former extending upwardly from the housing 1 and at an angle backwardly therefrom and supports at its upper end a steering wheel 3, while the latter shaft 4 extends horizontally backwardly from the housing 1 and is connected through universal joints to the propeller housing, hereinafter described in detail. Mounted on the shaft 2, and within the housing 1, are a pair of spaced apart bevel gears 5 and 6, the latter being considerably larger than the former. On the shaft 4, and within the housing 1, are mounted other gears 7 and 8 adapted to mesh, respectively, with the gears 5 and 6. The gear 7 is slidably mounted on but non-rotatably relative to the shaft 4, while the gear 8 is rotatably mounted on the shaft. The portion 4a of the shaft 4 on which the gear 7 is mounted is splined or feathered so as to provide means for non-rotatably connecting the gear 7 to the shaft 4 at all times. The gear 7 is provided with a hub 7a in which is provided an annular groove 7b. At the end of the hub 7a opposite the gear 7, are lugs or teeth 7c which are adapted to engage teeth 8a on the adjacent side of the gear 8, forming a clutch with said gear when the gear 7 is disengaged from the gear 5 and shifted backwardly into engagement with the clutch portion of the gear 8. When the gear 7 is so shifted, the gear 8 is non-rotatably connected relative to the shaft 4 and rotates the latter when the gear 8 is rotated by the gear 6. The gear 7 is of approximately the diameter of the gear 5, thus providing a one to one ratio between the shafts 2 and 4 when the gears 5 and 7 are in mesh. The gear 6 is many times larger than the gear 8; thus, when the gear 8 is positively connected to the shaft 4, and the gear 8 rotated by the gear 6, the shaft 4 rotates many times faster than the shaft 2.

The gear 7 is disengaged from the gear 5 and the hub thereof operatively connected with the gear 8 by a shifting means consisting primarily of a yoke 11, a shifting fork 12 and a rock shaft 13. The yoke 11 is fitted into the groove 7b and is provided with diametrically opposed lugs 11a which extend into slotted holes 12a in the forked ends of the clutch arm 12. The clutch arm 12 is secured to the rock shaft 13 which extends transversely through and is mounted at its ends on the housing 1. Mounted on the rock shaft 13 outside of the housing is an arm 14 which is pivotally connected at its end by a connecting rod 16 to a gear shifting lever 15. This lever 15, in this instance, is mounted on the side wall of the control compartment of the boat, the lever being pivotally mounted intermediate its ends. The lever 15 is provided with a handle 15a at one end and an arm 15b at its opposite end, that is, at the end opposite the side of its pivotal axis from the handle end. This arm 15b is connected to the connecting rod 16. When the lever 15 is pulled backwardly, the gear 7 is also shifted backwardly until its hub engages the gear 8, thereby changing the gear ratio between the steering wheel 3 and the propeller housing to which the shaft 4 is connected.

The propeller mechanism B, in this instance, is supported on housings 21 and 22. The housing 21 is the supporting housing and is, in this instance, secured to the stern of the boat, while the housing 22 is the propeller supporting housing and is rotatably supported by the housing 21 and is adapted to be turned about a vertical axis in the latter for steering the boat. The propeller, designated 23, is supported by and at the lower end of the housing 22 and is driven by a motor or engine 24 through shafts 25, 26 and 27. The shafts 25 and 26 are connected by a pair of bevel gears 28 positioned in and enclosed by the upper portion of the housing 21, while the shafts 26 and 27 are connected by a second pair of bevel gears 29 positioned in and enclosed by the lower end of the housing 22.

To the upper end of the rotatable housing 22 is secured a worm gear 30. This gear is supported on an annular shoulder 21b within the housing 21 and thus supports the housing 22 with respect to the housing 21. The worm gear 30 meshes with a worm 31 mounted in and on the housing 21. This worm is connected through universal joints, above mentioned, to the shaft 4 of the steering device A. Thus, when the steering wheel 3 is rotated, whether one or the other sets of gears are in mesh, the propeller supporting housing 22 is rotated relative to the supporting housing 21, thus causing the boat to be turned or propelled in a certain direction, depending upon the position of the longitudinal axis with respect to the longitudinal axis of the boat hull.

When traveling at high speed through the water, it is not only desirable but necessary to have a relatively sensitive control of the directional shifting of the axis of the propeller relative to the axis of the boat, that is, it is necessary that the propeller supporting housing be turned slowly with respect to the rotation of the steering wheel in order to obtain a sensitive control of the steering of the boat. Thus, when operating the boat at high speed, the gear 7 is in engagement with the gear 5, which is substantially the same ratio between the steering wheel and the rotation of the propeller supporting housing, as between the worm shaft and the propeller supporting housing. However, when maneuvering, such as when docking or when desiring to reverse the direction of travel of the boat, it is highly desirable that the propeller supporting housing be turned quickly and, when reversing, to turn the housing completely around. When desiring to maneuver in this manner, the lever 15 is pulled backwardly, thereby connecting the gear 6 through the gear 8 directly with the shaft 4, increasing the gear ratio between the steering wheel 3 and the propeller supporting housing 22, thereby making it possible to rotate the propeller housing 22 in the desired direction substantially instantaneously.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a steering mechanism of the class described, a pair of shafts, one of said shafts having a steering wheel mounted thereon, sets of gears in connection with said shafts, said sets of gears being of different ratios, one gear of one of said sets of gears being slidable longitudinally on one of the shafts, said slidable gear having a clutch portion on one end thereof for engaging a corresponding clutch portion on one of the gears of another set, means for sliding said slidable gear longitudinally of said shaft, and means for non-rotatably connecting said slidable gear to said shaft.

2. In a device of the class described, the combination with a motor boat having propeller means mounted thereon comprising a housing and a propeller mounted thereon, said propeller means having means for turning the propeller supporting housing thereof about a vertical axis, of a steering mechanism comprising two shafts positioned with their axes at an angle, one of said shafts having a steering wheel mounted thereon, the second shaft being connected to the means for turning the propeller supporting housing about a vertical axis, sets of gears adapted to connect said shafts, said sets of gears being of different ratios, one gear of said sets of gears being shiftable from engagement from its meshing gear, said shiftable gear having means connected thereto for sliding the same longitudinally of the second shaft.

3. In a device of the class described, the combination with a motor boat having propeller means mounted thereon comprising a housing and a propeller mounted thereon, said propeller means having means for turning the propeller supporting housing thereof about a vertical axis, of a steering mechanism comprising two shafts positioned with their axes at an angle, one of said shafts having a steering wheel mounted thereon, the second shaft being connected to the means for turning the propeller supporting housing about a vertical axis, said second shaft being splined, and sets of gears adapted to connect said shafts, said sets of gears being of different ratios, one gear of said sets of gears being slidable on said splined shaft and having means operatively connecting said sliding gear to said splined shaft, said slidable gear being provided with clutch means for engaging corresponding clutch means in a second gear of another set rotatably mounted on and with respect to said splined shaft, said revolvable gear being in engagement with its meshing gear of the latter set, the latter gear being mounted on said shaft provided with said steering wheel.

4. In a device of the class described, the combination with a motor boat having propeller means mounted thereon comprising a housing and a propeller mounted thereon, said propeller means having means for turning the propeller supporting housing thereon about a vertical axis, of a steering mechanism comprising two shafts positioned with their axes at an angle, one of said shafts having a steering wheel mounted thereon, the second shaft being connected to the means for turning the propeller supporting housing about a vertical axis, said second shaft being splined, sets of gears adapted to connect said shafts, said sets of gears being of different ratios, one gear of said sets of gears being slidable on said splined shaft and having means operatively connecting said sliding gear to said splined shaft, said slidable gear being provided with clutch means for engaging corresponding clutch means in a second gear of another set rotatably mounted on and with respect to said splined shaft, said revolvable gear being in engagement with its meshing gear of the latter set, the latter gear being mounted on said shaft provided with said steering wheel, and means for sliding said slidable gear from engagement with its meshing gear and for connecting said clutch means, the latter means comprising a rock shaft having arms mounted thereon, said arms being adapted to engage said slidable gear, a lever mounted in the operating compartment of said boat, and means connecting said lever with said rock shaft.

In testimony whereof, I have hereunto set my hand at Long Beach, California, this 15th day of May, 1930.

ELMER E. PECK.